United States Patent [19]

Himes et al.

[11] Patent Number: 5,363,916

[45] Date of Patent: Nov. 15, 1994

[54] METHOD OF GRAVEL PACKING A WELL

[75] Inventors: Ronald E. Himes; Marlin D. Holtmyer; Charles V. Hunt; Mary A. H. Laramay, all of Duncan, Okla.

[73] Assignee: Halliburton Company, Duncan, Okla.

[21] Appl. No.: 78,946

[22] Filed: Jun. 16, 1993

Related U.S. Application Data

[63] Continuation-in-part of Ser. No. 994,248, Dec. 21, 1992, abandoned.

[51] Int. Cl.$^5$ ............................................. E21B 43/04
[52] U.S. Cl. ..................................... 166/276; 166/278; 166/300; 252/8.551
[58] Field of Search ............... 166/276, 278, 300; 252/8.551

[56] References Cited

U.S. PATENT DOCUMENTS

| | | | |
|---|---|---|---|
| 2,814,347 | 11/1957 | MacKnight | 166/278 |
| 3,627,046 | 12/1971 | Miller et al. | 166/278 |
| 4,544,032 | 10/1985 | Echols | 166/267 |
| 4,552,215 | 11/1985 | Almond et al. | 166/278 |
| 4,801,389 | 1/1989 | Brannon et al. | 252/8.551 |
| 4,850,430 | 7/1989 | Copeland et al. | 166/276 |
| 4,915,173 | 4/1990 | Davis | 166/278 |
| 4,982,793 | 1/1991 | Holtmyer et al. | 166/305.1 |
| 5,067,565 | 11/1991 | Holtmyer et al. | 166/305.1 |
| 5,067,566 | 11/1991 | Dawson | 252/8.551 X |
| 5,122,549 | 6/1992 | Holtmyer et al. | 523/130 |

*Primary Examiner*—George A. Suchfield
*Attorney, Agent, or Firm*—Robert A. Kent

[57] ABSTRACT

The present invention provides a method of gravel packing a subterranean formation using a gel of a graft copolymer of a hydroxyalkyl cellulose prepared by a redox reaction with vinyl phosphonic acid. The gel is formed by hydrating the graft copolymer in an aqueous liquid. The gel in crosslinked by the addition of a crosslink initiator comprising a Lewis base or Bronsted-Lowry base, which is substantially free of polyvalent metal ions, to the gel in an amount sufficient to effect crosslinking of the graft copolymer. The viscosity of the crosslinked gel is reduced by contacting the gel with an acidic fluid whereby the pH of the gel is caused to decrease. The reduction in gel viscosity facilitates formation of the gravel pack.

20 Claims, No Drawings

METHOD OF GRAVEL PACKING A WELL

CROSS REFERENCE TO RELATED APPLICATION

The present application is a continuation in part of U.S. patent application Ser. No. 07/994,248 filed on Dec. 21, 1992, now abandoned, entitled "Method Of Crosslinking Cellulose And Guar Derivatives For Treating Subterranean Formations."

BACKGROUND OF THE INVENTION

The present invention relates to methods for gravel packing of wellbores penetrating subterranean formations and particularly for gravel packing highly deviated wellbores.

Petroleum recovery operations, such as well stimulation and gravel packing, often require the use of fluid compositions capable of suspending particles. In gravel packing operations, a pack of gravel is placed on the exterior of a perforated or slotted liner or screen which is positioned across an unconsolidated formation. The resulting structure presents a barrier to migrating sand from the formation while still permitting fluid flow. The gravel is carried to the formation in the form of a slurry by mixing gravel with a viscosified fluid. Once the gravel is placed in the wellbore, the viscosified carrier fluid is degraded and returned to the surface.

Prior to effecting the gravel pack, drilling mud and other contaminants may be washed from the wellbore and the formation treated. Commonly employed treatments include acidizing to dissolve formation clays and injecting stabilizing agents to prevent migration of formation components.

While numerous methods are available for effecting gravel packs in substantially vertical wellbores, such methods often are unsatisfactory in effecting gravel packing of highly deviated wellbores. Conventional gravel packing fluids utilizing uncrosslinked hydroxyethyl cellulose, hydroxypropyl guar, xanthan gum and the like as the viscosifier allows or permit the gravel to fall or settle to the low side of the tubing in long highly deviated wells. Such settling can result in a premature "sand-out" caused by a bridging of the settled particles across the tubing. Mechanical devices such as a baffled washpipe and oversized washpipes have been used to attempt to prevent or minimize the premature settling of the gravel. Such devices have experienced only limited success in solving the problem.

An ideal fluid for gravel packing operations would be one that shows little or no settling of gravel so that a high concentration of gravel can be transported through the tubing at any angle. The fluid also should exhibit adequate fluid loss into the formation matrix to insure compact packing of the gravel against the formation face. The fluid also should "break" to a reduced viscosity fluid similar to the viscosity of water over a predesigned time interval and deposit no residual solids so as to avoid or minimize any formation damage.

Gravel packing of wells which are highly deviated necessitate the use of a viscosified fluid which is capable of providing an infinite gravel fall rate, that is a substantially zero rate of gravel settling in the fluid during placement in the wellbore. A gravel packing fluid having a substantially zero gravel fall rate would assure that the gravel being carried to the production zone in a highly deviated wellbore would not prematurely settleout.

One method employed to substantially achieve a zero gravel fall rate with a polymeric gravel packing fluid is to crosslink the polymer. An aqueous solution of a crosslinked polymer provides a gel structure which suspends the gravel particles causing substantially a zero fall rate. Polymers which typically have been utilized are guar, hydroxypropyl guar and carboxymethylhydroxypropyl guar and derivatized cellulose such as carboxymethylhydroxyethyl cellulose because of their ease of crosslinking with metal ions such as titanium (IV) and aluminum (III). The main objections to using such fluids for gravel packing operations are the limited amount of fluid loss to the formation which may cause voids within the pack and the excessive amount of formation damage which can result from use of the fluids due to water insoluble particles, particularly such as those found in guar based derivatives. The water insoluble particles are believed to remain in the formation and may cause formation plugging or impair the permeability of sand or gravel packs.

Cellulose derivatives are a preferred viscosifying polymer for certain petroleum recovery operations because they degrade, i.e., lose viscosity while generating only limited amounts of water insoluble particles or residue. Cellulose derivatives have had limited use in many petroleum applications because most derivatives are salt sensitive or not crosslinkable. Common non-ionic derivatives of cellulose are generally not crosslinkable because the polymer lacks a site for attachment of a multivalent metal cation. Examples of this type include hydroxyalkyl cellulose ethers, methyl cellulose, ethyl cellulose and hydroxyalkylmethyl cellulose. A crosslinkable non-ionic cellulose derivative has been prepared and described in U.S. Pat. Nos. 4,523,010 and 4,552,215 which are herein incorporated by reference. In these disclosures, dihydroxypropylhydroxyalkyl cellulose is prepared by a condensation reaction of glycidol with hydroxyethyl cellulose (HEC) under alkaline conditions. The glycidol addition along the HEC polymer chain provides a site of attachment for multivalent metal cations.

Anionic cellulose derivatives are normally substituted with carboxyl groups along the polymer chain. The carboxyl groups complex with polyvalent metal cations, such as aluminum. Gels formed with this chemistry tend to have limited structural stability at formation temperatures of about 200° F. In addition, carboxylate substituents render the polymer salt sensitive, i.e., the viscosity of the polymer in a salt solution is less than the viscosity in water. Salt sensitivity is not a desirable property because the aqueous liquids used in recovery operations most generally contain chloride salts to inhibit the swelling of formation clays.

The present invention provides new and useful methods of effecting gravel packing through use of new methods of crosslinking in selected graft copolymers of cellulose derivatives, which are generally non-ionic in character. Methods of grafting monomers on polyhydroxy containing compounds are well known in the art. The process is described in U.S. Pat. No. 2,922,768, herein incorporated by reference. U.S. Pat. Nos. 4,982,783; 5,067,565; and 5,122,549, the entire disclosures of which are incorporated herein by reference, describe processes by which crosslinkable cellulose derivatives are prepared by grafting vinyl or allyl monomers having a crosslinkable substituent onto the cellulose derivative. The resulting copolymer is non-ionic and crosslinks readily with polyvalent metal cations to form stable viscoelastic gels.

SUMMARY OF THE INVENTION

The surprising discovery now has been made that certain graft copolymers of hydroxyethyl or hydroxypropyl cellulose, prepared by a redox reaction with vinyl phosphonic acid monomers or polymers and hydroxyethyl or hydroxypropyl cellulose, can be crosslinked by the addition of a Lewis base or Bronsted-Lowry base or mixture of such bases to an aqueous solution containing the graft copolymer. The base utilized generally is substantially free of polyvalent metal ions that is, metal ions having more than one valence state. The crosslinked structure formed by the addition of the base can be reversed by lowering the pH through the addition of an acid generating compound. The polymer itself may be further degraded by the addition of conventional breakers. The crosslinked gels are particularly useful in gravel packing operations in that the crosslinked cellulose derivatives provide highly viscous gels that can be degraded without generating significant quantities of water insoluble residue.

The gravel packing fluid is introduced into a subterranean formation through a wellbore penetrating the formation. The gravel packing fluid generally incorporates a breaker to provide controlled fluid viscosity reduction and facilitate fluid recovery.

DESCRIPTION OF THE PREFERRED EMBODIMENTS

The present invention provides a method and composition for use in gravel packing wellbores penetrating subterranean formations and particularly deviated wellbores. The term "deviated wellbore" as used herein means a wellbore in which any portion of the well is in excess of about 55 degrees from a vertical inclination. The gravel packing fluid composition of the present invention comprises an aqueous liquid, a novel gelling agent and a selected crosslinking agent. The fluid can carry substantial quantities of gravel into a subterranean formation without premature settling and can be pumped into the formation utilizing pumping equipment and tubular goods normally available at a wellhead.

An aqueous liquid is used to solubilize the novel copolymer of the present invention. The term "aqueous liquid" is used hereafter to mean any liquid containing sufficient water to at least partially hydrate the copolymer and result in an increase in the viscosity of the fluid. Aqueous liquids used in petroleum recovery operations normally contain sodium chloride, potassium chloride, calcium chloride, sodium bromide and other bromides, ammonium chloride, tetramethylammonium chloride or the like to weight the fluid or inhibit the swelling of clays generally found in subterranean formations. The pH of the aqueous liquid must be compatible with the selected crosslinking agent and must not adversely affect the hydration of the copolymer. Such liquids generally contain at least a trace amount of at least one divalent cation, generally in the form of contaminants in the aqueous liquid.

In one embodiment of the present invention, the crosslinkable copolymers are prepared by reacting certain vinyl monomers comprising vinyl phosphonic acid (VPA), with a cellulose derivative using a redox system comprising ceric ions and nitric acid. The generalized reaction is believed to be represented by the formula:

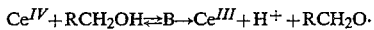

where B is the ceric-alcohol complex, $RCH_2OH$ is the cellulose derivative and $RCH_2O \cdot$ is a free radical. Graft copolymerizations of cellulose commonly use chemical initiators, such as ceric ions. In acid media, ceric ions oxidize 1,2-glycols with the formation of a free radical on a reducing agent, which is the cellulose derivative in this case. The free radical produced on the cellulose derivative initiates polymerization with the vinyl group of the monomer to produce the graft copolymer.

The term "vinyl phosphonic acid or VPA" as used herein includes not only the acid monomers and polymers but is also intended to include the aqueous soluble salts such as sodium or potassium vinyl phosphonate and the like whereby a vinyl phosphonate ion is formed upon dissolution in an aqueous fluid as well as mono esters of vinyl phosphonic acid.

The cellulose derivative of this invention is preferably a hydroxyalkyl cellulose having a hydroxyalkyl molar substitution from about 1.5 to about 3.0. Molar substitution is defined as the average number of moles of a substituent group present per anhydrogluclose unit of the cellulose material. The alkyl group is selected from the group of ethyl, propyl and mixtures thereof. The preferred hydroxyalkyl cellulose is hydroxyethyl cellulose (HEC) having a molar substitution in the range of about 1.8 to about 2.5. Preferably in this invention, the hydroxyalkylation of the cellulose is performed in a separate reaction. Hydroxyethyl cellulose is usually formed by reacting ethylene oxide with cellulose under extreme alkaline conditions and is available commercially.

The copolymers of the present invention are rendered crosslinkable by grafting monomers comprising a vinyl phosphonic acid to the cellulose derivative. The monomers have the reactive

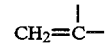

moiety that is believed to enable the monomer to attach to the cellulose derivative.

Typically, graft copolymerizations are carried out in aqueous media wherein the polymer is dissolved or dispersed. Copolymers of this invention were prepared in acetone (55% to 90%) and water (45% to 10%) or methanol (about 70%) and water (about 30%). Reactions were carried out in a 1 liter kettle with a stirrer or a 1 liter jar at about 20° C. to about 60° C. The ratio of cellulose derivative to aqueous medium ranges from about 1 gram per 100 ml. to about 1 gram per 2 ml. The preferred ratio is from about 1 gram per 6 ml. to 1 gram per 4 ml. The ratio of cellulose derivative to grafting VPA monomer ranges from about 3 grams per 1 ml. to about 25 grams per 1 ml. The preferred ratio is from about 6 grams per 1 ml. to about 16 grams per 1 ml.

The polymerization reaction of the present invention may be chemically initiated by a redox system comprising ceric ions in acidic medium. Ceric ions may be provided, for example, by salts such as ceric nitrate, ceric sulfate, ceric ammonium nitrate and ceric ammonium sulfate. The preferred ceric initiator of the present invention is a solution of ceric ammonium nitrate in 1N nitric acid. Ceric ammonium nitrate is present in an amount of from about 0.00075 mole per 100 ml. to about 0.005 mole per 100 ml. reaction medium.

The ceric initiator may be added slowly to the reaction material over a time period of about 30 to 90 seconds or longer. Reaction times vary from about 10 minutes to 20 hours depending on reaction conditions or the particular grafting monomer. Grafting reaction efficiency is generally less than about 50%. After the reaction is complete, the polymerization product is washed with acetone, filtered and dried.

In another embodiment of the present invention, the crosslinkable copolymers are prepared by reacting certain vinyl monomers having a crosslinkable substituent with a cellulose derivative using a redox system comprising, for example, the reaction product of hydrogen peroxide with a ferrous salt. The generalized redox reaction is believed to be represented by the formula:

and the generalized initiation reaction is believed to be represented by the general formula:

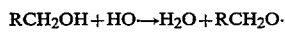

An advantage of this initiator is that radical production occurs at a reasonable rate over a wide temperature range whereby reactions can be carried out at room temperature, if desired. The free radical produced on the cellulose derivative initiates polymerization with the vinyl group of the monomer to produce the graft copolymer.

Typically, the graft copolymerization is carried out in aqueous media wherein the polymer is partially dissolved or dispersed. Copolymers were prepared in acetone/water mixtures containing from about 55 to about 90% acetone. Reactions were carried out in a 1 liter kettle with a stirrer or a 1 liter jar at a temperature of from about 20° to about 60° C. The ratio of cellulose derivative to aqueous medium ranges from about 1 gram per 100 ml. to about 1 gram per 2 ml. The preferred ratio is from about 1 gram per 2 to 5 ml. The ratio of cellulose derivative to grafting VPA monomer ranges from about 5 to about 40 grams per 1 gram of monomer. The preferred ratio is from about 6 to about 16. It is to be understood that the ranges set forth above are merely exemplary and that other temperatures, concentrations and the like maybe utilized to prepare the reaction product.

The polymerization reaction of this embodiment of the invention is chemically initiated by a redox system comprising the reaction product of a peroxide, such as hydrogen peroxide, with a ferrous salt. Ferrous ions may be provided, for example, by salts such as ferrous ammonium sulfate, ferrous chloride, ferrous sulfate, ferrous acetate, ferrous oxalate, ferrous acetylacetonate and the like. A preferred source of ferrous ions is ferrous ammonium sulfate. Alternatively, other commonly used metal ion reductants may be utilized in place of the ferrous ions to generate the free radicals necessary to effect grafting and other forms of hydrogen peroxide such as t-butylhydroperoxide may be used. The initiator may be added slowly to the reaction material over a time period of about 30 to 90 seconds or longer. Reaction times vary from about 15 minutes to about 4 hours depending upon the reaction conditions or the particular grafting monomer. Grafting reaction efficiency (% of monomer grafted) is generally less than about 75%.

After the reaction is complete, the polymerization product is washed with acetone, filtered and dried.

In a preferred method of effecting the graft copolymerization, the grafted polymer product is retained in a substantially storage stable slurry form. Typically, the media comprises a polyglycol, such as polypropylene glycol having molecular weights up to about 1000 such as "PPG-250" to "PPG-1000" from Texaco Chemical Co., various polyethylene glycols and homopolymers of 1, 2 butylene oxide having a molecular weight of from about 200 to about 400 which are present in an amount of from about 70 to about 95 percent by weight of the media and the remainder generally being water. The media also may comprise tetramethylammonium chloride in a similar amount or in admixture with a polyglycol. In a preferred embodiment the polyglycol comprises from about 86 to 92 percent by weight of the media. Reactions were carried out in a 5 liter kettle with a stirrer at a temperature of from about 20° to 60° C. The ratio of cellulose derivative to media ranges from about 1 gram per 100 ml to about 1 gram per 2 ml. the preferred ratio is from about 1 gram per 2 to 5 ml. The reaction media also may include a quantity of a dispersant or thixotrope such as alkyl quaternary ammonium montmorillonite ("CLAYTONE AF" dispersant from E.C.C. America, Inc.) or dimethyldicocoammonium chloride to facilitate dispersion of the polymer in the media and improve suspension properties. The grafting reaction is performed as previously described using an appropriate redox system such as the ferrous salt with a source of peroxide. Since the metal ions are not removed from the product by washing as when a dry product is formed, a sequestrant for the metal ions may be added to the slurry at the conclusion of the reaction to facilitate subsequent hydration of the polymer. The polymerization product has been found to remain readily dispersible or suspended in the slurry form over a period of time to facilitate storage and handling.

Graft copolymers of the present invention solubilize in aqueous liquids and substantially increase the viscosity of aqueous liquids. The viscosity of the copolymer solution may be further increased with the addition of a selected crosslinking activator or agent which effects an initiation of a crosslink interaction. Preferred crosslinking activators or agents in accordance with this invention comprise Bronsted-Lowry or Lewis bases which generally are substantially free of polyvalent metal ions, that is, ions having more than one valence state. Suitable compounds include, for example, calcium oxide, magnesium oxide and compounds selected from mono, di and trialkanol amines such as triethanolamine, sodium hydroxide, potassium hydroxide, ammonia, various cocoamines such as Bis(2-hydroxyethyl) cocoamine, various pentamines such as tetraethylenepentamine and various other water soluble amines, such as propyldiethanolamine, triethylamine, various water soluble borates such as the commercially available product "POLYBOR", an admixture of boric acid and borate salts, from U.S. Borax and the like in the presence of a divalent cation, such as calcium or magnesium, which is present in at least a trace amount and which may be present in the aqueous liquid utilized to hydrate the copolymer or added as an additional component to the aqueous liquid. Such compounds are substantially free of polyvalent metal ions. A particularly preferred crosslinking activator or agent is magnesium oxide. As a result of the limited solubility of magnesium oxide in an aqueous solution, the rate of crosslink development is retarded or delayed such that the particulate laden gelled fluid can be easily formed and thereafter readily pumped into a wellbore without significant particulate settling.

A surprising effect has been noted in the crosslinking of the polymer of the present invention in aqueous fluids containing salts. It has been found that when the polymer is hydrated in deionized water to which a small quantity of HCl has been added to facilitate hydration, the pH must be raised by the addition of the crosslinking agent to a level of about 6 before any significant crosslinking occurs. When the polymer is hydrated in an aqueous salt solution, such as for example $CaCl_2$ brine to which a small quantity of HCl is added, the pH at which crosslinking occurs is substantially lower. For example, in a 9 pound per gallon $CaCl_2$ brine, crosslinking has been found to occur at pH of about 4.5 and when 13.5 pound per gallon $CaCl_2/CaBr_2$ brine is employed, crosslinking was found to occur after the addition of sufficient crosslinking agent to raise the pH of the solution to a level of about 1.5.

While the specific mechanism by which the crosslinking occurs is unknown, it is believed that the crosslink is formed through the phosphorus moiety in the copolymer which is activated by the presence of the Lewis or Bronsted-Lowry base.

While the following description will be directed to the use of magnesium oxide as a crosslinking activator or agent, it is to be understood that the described method would apply generally to any of the other suitable crosslinking agents of the present invention. A base gel is prepared by hydrating the previously described graft copolymer of hydroxyethyl cellulose or hydroxypropyl cellulose in an aqueous fluid at a pH in the range of from about 0.1 to about 3.5. The graft copolymer can be admixed with the aqueous fluid in an amount of from about 10 to about 300 pounds per 1000 gallons of fluid. After the gelling agent has substantially hydrated, the base gel is admixed with a quantity of magnesium oxide.

The mixing can be effected in substantially any conventional mixing apparatus. The magnesium oxide generally is admixed with the base gel in an amount of from about 3 to about 30 pounds per 1000 gals of base gel. In a preferred method of addition, the magnesium oxide is added as an aqueous slurry to facilitate handling of the material.

Any of a variety of conventional particulate agents may be employed with the gravel packing fluid compositions of the present invention such as quartz sand, ceramic beads, particulate garnet, glass beads, synthetic resins, resin coated sand, walnut shell fragments, nylon pellets and similar materials. The agents may include an adhesive coating as is well known in the art to strengthen the resultant gravel pack. In deviated wells, the lighter particulates having a specific gravity of from about 0.75 to below about 3.0 are preferred. Such agents are generally used in concentrations between about 1 to about 20 pounds per gallon of the gravel packing fluid composition, but higher or lower concentrations may be used as required. The size of particulate agent employed depends on the particular type of formation and the particle size of formation particulates and the like. Particles having a size in the range of from about 8 to about 70 mesh on the U.S. Sieve Series scale generally may be employed.

In addition, so long as the particular materials employed do not adversely interfere with the crosslinking reaction, any of a variety of auxiliary agents used in conventional gravel packing fluids may be included. For example, friction reducers, biocides, surfactants, auxiliary stabilizers, fluid loss agents and the like are known in the art and may be employed.

The gravel pack of the present invention may be formed in a variety of ways. In one method of introducing the particulate into the well, the base gel of aqueous fluid and the previously described graft copolymer is filtered through a commercially available filtration device such as a cartridge and/or plate and frame filter to remove any solids that might adversely effect the permeability of the subterranean formation. The base gel also may be treated in a manner similar to the process disclosed in U.S. Pat. No. 3,544,032, the disclosure of which is incorporated herein by reference, or otherwise mechanically or hydraulically sheared to enhance hydration prior to fluid filtration. Thereafter the crosslinking activator is admixed with the base gel and the gravel material. No specific order of addition has been found necessary for effective formation treatment. The thus formed crosslinked slurry is pumped down tubing in the wellbore to a packer and crossover tool assembly located above the screen or slotted liner that has been placed in the wellbore adjacent to a zone of a subterranean formation. Such tools are well known in the industry and substantially any such assembly may be utilized. Examples of suitable tool assemblies include those described in U.S. Pat. Nos. 4,722,392; 4,840,229; and 5,103,902, the disclosures of which are incorporated herein by reference. Generally the crossover tool assembly incorporates a circulation control valve which allows fluids to be circulated down the tubing above the packer and then into the annulus surrounding the screen or slotted liner below the packer through the screen or slotted liner and then back to the surface through the annulus surrounding the tubing above the packer. This is typically referred to as the "lower circulation position." The control valve also includes means to circulate down the tubing above the packer and then back up the tubing annulus without passage through the screen. This is typically referred to as the "upper circulation position." The control valve also includes means to prevent the flow of fluids up the tubing annulus to permit pressure to be applied to the fluid present in the screen or slotted liner annulus below the packer. This is typically referred to as the "squeeze position."

To enhance the performance of the gravel pack of the present invention a quantity of an acidic fluid is placed in contact with the formation prior to introduction of the crosslinked slurry into the screen annulus. This is accomplished by pumping the acidic fluid down the tubing and through the circulation control valve while positioned in the lower circulation position before the crosslinked slurry is pumped. The circulation valve then is positioned in the upper circulation position and fluid is pumped down the tubing and recirculated to the surface until the crosslinked slurry reaches the circulation valve. The circulation valve then is placed in the lower position and the slurry is introduced into the annulus surrounding the screen or slotted liner. It has been discovered that upon contact of the slurry with the acidic fluid, the pH of the slurry decreases and the slurry rapidly loses fluid viscosity as the crosslink reverses permitting increased fluid loss to the formation and through the screen upon continued slurry injection.

The gravel material is separated from the slurry as the fluid is forced into the formation and through the screen forming a pack with a minimum of void spaces. Upon filling of the screen annulus the circulation control valve is positioned in the squeeze position to permit pressure to be applied to the slurry to further consolidate the pack and force the lower viscosity fluid from the slurry into the formation thereby increasing the pack efficiency. Thus is obtained the benefits of a crosslinked fluid for transport of the slurry to the zone of placement and the benefits of a non-crosslinked fluid for obtaining the high fluid loss necessary to obtain a substantially void-free pack.

In an alternate embodiment, an acidic fluid may be introduced behind the gravel pack slurry, during the squeeze process, to reduce the viscosity of the slurry upon contact therewith to facilitate fluid loss. In such an instance, it would be unnecessary to initially place an acidic fluid in the zone to be gravel packed before introduction of the gravel pack slurry.

The acidic fluid can comprise substantially any fluid having a pH below that of the crosslinked gel slurry whereby upon contact with the slurry the pH of the slurry is reduced and the viscosity of the slurry is caused to decrease. Examples of such fluids include, but are not limited to, hydrochloric acid solutions, solutions of organic acids such as fumaric acid, acetic acid, citric acid and the like, polyhydroxyacetic acid, encapsulated forms of acids or acid generating compounds and the like.

The following examples are provided to illustrate the utility of the composition of the present invention, however the invention is not to be considered as limited by these examples.

EXAMPLE I

To a 5 liter round bottom kettle, equipped with a stirrer, temperature controller and a $N_2$ sparge tube, the following reactants were added, about 2380 grams of "PPG-400" polypropyleneglycol (from Texaco Chemical Co.) and about 60 grams "CLAYTONE AF" alkyl quaternary ammonium montmorillonite (from E.C.C. America, Inc.). The mix is stirred and nitrogen gas sparging is begun. Thereafter 1079 grams of hydroxyethyl cellulose (MS of about 2.2) is added and heating is initiated to slowly raise the temperature to about 40° C. (generally 30 min to 1 hr.). After temperature is reached, the temperature is maintained for about 1 hour to remove oxygen contamination.

While the above mixture is being heated about 319 grams of deionized water are admixed with about 10.5 grams of ferrous ammonium sulfate (reagent grade) in an erlenmeyer flask, while sparging, and dissolved. To this mixture is added about 121 grams of vinyl phosphonic acid from Hoechst Celanese Corporation and mixing and sparging is continued until the materials are dissolved. The solution then is added at the end of the sparging period to the 5 liter kettle.

The temperature is maintained while stirring and sparging and after about 1 hour 17.3 grams of 70% t-butylhydroperoxide is added to the kettle which then is allowed to react for about an hour. After the reaction is completed, a sequestrant, such as "DEQUEST® 2010" sequestrant from Monsanto Company, is added to the slurry to sequester the metal ions present and stirred. The reaction mixture then is permitted to cool. The reaction produced a 30% active polymer slurry.

A one (1) liter sample is prepared by mixing a sufficient quantity of the polymer with tap water to yield a 120 pound per 1000 gallon solution of the polymer of the present invention. To facilitate hydration, sufficient acid, such as 15% hydrochloric acid, is admixed with the solution to correspond to about 10 gallons per 1000 gallons of solution. The acid may be omitted or lesser quantities may be used if slower hydration is acceptable or desired. It is to be understood that other acid concentrations also could be utilized.

After being permitted to hydrate to form a gel, the gel is admixed with the equivalent of about 15 pounds per 1000 gallons of magnesium oxide in the form of an aqueous slurry and a sample is evaluated with a "FANN MODEL 35 ®" viscometer. The pH of an aliquot sample also is monitored. The viscometer is equipped with a #1 spring, standard bob and sleeve. The results of the test are set forth below in Table I.

TABLE I

| Time Minutes | Viscometer Dial Reading at 5.11 $Sec^{-1}$ | pH |
|---|---|---|
| 1 | 18 | 1.98 |
| 5 | 18 | 5.28 |
| 6 | 18 | 5.70 |
| 7 | 19 | 5.98 |
| 8 | 20 | 6.17 |
| 9 | 22 | 6.30 |
| 10 | 23 | 6.41 |
| 11 | 25 | 6.50 |
| 12 | 27 | 6.57 |
| 13 | 29 | 6.63 |
| 15 | 33 | 6.74 |
| 20 | 51 | 6.92 |
| 25 | 70 | 7.06 |
| 30 | 93 | 7.17 |

The results clearly demonstrate the crosslink development upon addition of the base to the gelled fluid. The above test is repeated utilizing a 9 pound per gallon density $CaCl_2$ brine instead of tap water. The results of the test are set forth in Table II, below.

| Time Minutes | Viscometer Dial Reading at 5.11 $Sec^{-1}$ | pH |
|---|---|---|
| 1 | 27 | 1.5 |
| 2 | 28 | 3.35 |
| 3 | 27 | 4.29 |
| 4 | 35 | 4.79 |
| 5 | 60 | 5.09 |
| 6 | 160 | 5.29 |
| 7 | 260 | 5.44 |

EXAMPLE II

To further demonstrate the crosslinkability of polymers produced in accordance with the present invention, the following test was performed. A polymer solution corresponding to 120 pounds per 1000 gallons of 9 pound per gallon density $CaCl_2$ brine was prepared to which was added an equivalent of 28 pounds of triethanolamine per 1000 gallons of solution. The fluid then was placed on a "FANN MODEL 50 ®" viscometer and evaluated at 176° F. The results of the test are set forth below in Table III.

TABLE III

| Time After Addition Of Crosslink Activator, Minutes | Time At Temperature, Minutes | Fluid Temperature, F. | Apparent Viscosity, (cps) at 170 $Sec^{-1}$ |
|---|---|---|---|
| 24 | 0 | 82 | 1087 |
| 28 | 4 | 177 | 919 |
| 43 | 19 | 180 | 924 |
| 58 | 34 | 177 | 947 |
| 73 | 49 | 176 | 910 |

TABLE III-continued

| Time After Addition Of Crosslink Activator, Minutes | Time At Temperature, Minutes | Fluid Temperature, F. | Apparent Viscosity, (cps) at 170 Sec$^{-1}$ |
|---|---|---|---|
| 88 | 64 | 176 | 902 |
| 103 | 79 | 176 | 995 |
| 118 | 94 | 176 | 991 |
| 133 | 109 | 176 | 952 |
| 148 | 124 | 176 | 973 |

The results of the elevated temperature test clearly demonstrate the stability of the crosslinked gel formed in accordance with the present invention.

EXAMPLE III

To further demonstrate the crosslinkability of the gelled fluids of the present invention with various bases, the following tests were performed.

A polymer solution corresponding to 120 pounds per 1000 gallons of fluid was prepared. The aqueous fluid used was either 2% KCl solution prepared with water containing divalent cations or 9 pound per gallon density CaCl$_2$ brine. The polymer was hydrated by two different methods. Hydration method I comprised the addition of the gelling agent to a quantity of aqueous fluid followed by addition of further quantities of aqueous fluid during mixing. Hydration method II was the same as 1 with the addition of a quantity of 15% HCl equivalent to 10 gallons per 1000 gallons of solution to accelerate the rate of hydration. Quantities of various bases then were admixed with the gel in order to determine the crosslinkability. The results are set forth in Table IV, below.

TABLE IV

| Base | Quantity gallon per 1000 gallon | Aqueous Fluid | Gel Original pH | Gel Final pH | Gel Hydration Method | Comments |
|---|---|---|---|---|---|---|
| Triethanol Amine | 2 | 9#/gal CaCl$_2$ | 1.98 | 4.5 | II | Crosslinked |
| Triethanol Amine | 2 | 9#/gal CaCl$_2$ | 3.05 | 6.04 | I | Crosslinked |
| Triethanol Amine | 2 | 2% KCl | 2.62 | 7.03 | II | Crosslinked |
| Tetraethylene-pentamine | 2 | 9#/gal CaCl$_2$ | 3.0 | 8.5 | I | Crosslinked |
| Bis (2-hydroxyethyl) cocoamine | 6 | 9#/gal CaCl$_2$ | 3.0 | 5.52 | I | Crosslinked |
| Polybor | 30#/1000 gallon | 9#/gal CaCl$_2$ | 3.0 | 5.97 | I | Crosslinked |
| None | 0 | 9#/gal CaCl$_2$ | 3.0 | 3.0 | I | No Crosslink |
| None | 0 | 9#/gal CaCl$_2$ | 1.98 | 1.98 | II | No Crosslink |

EXAMPLE IV

To demonstrate the stability of the crosslinked gels of the present invention at elevated temperatures, the following test was performed. Samples were prepared with the aqueous fluids identified in Table V, below. The gelling agent was that of Example I and was present in an amount equivalent to 120 pounds per 1000 gallons of fluid. The equivalent of 10 gallons per 1000 gallons of fluid of 15% HCl was added to the gel to accelerate hydration. The quantity of MgO crosslinking agent added to each sample is set forth in Table V. The samples then were placed in 12 ounce water sample bottles identified as Citrate of Magnesia bottles. Each sample included 30 pounds per 1000 gallons of fluid of sodium thiosulfate, a conventionally used gel stabilizer, to assist in stabilizing the fluid samples. After about 1 hour, a marble was placed on top of each of the crosslinked gel samples and the samples were placed in a 260° F. oven. The stability of the gel was determined by settling of the marble in the gel sample upon heating and by visible changes in the gel. The results are set forth in Table VI, below.

TABLE V

| Sample No. | Aqueous Fluid | Crosslink Activator quantity, pounds per 1000 gallon |
|---|---|---|
| 1 | 10.5#/gal NaBr | 20 |
| 2 | 10.5#/gal NaBr | 30 |
| 3 | 8.6#/gal NaCl | 30 |
| 4 | 8.6#/gal NaCl | 30 |
| 5 | 10.0#/gal NaCl | 20 |
| 6 | 10.0#NaCl | 30 |
| 7 | 3% KCl | 20 |
| 8 | 3% KCl | 30 |
| 9 | synthetic sea water | 20 |
| 10 | synthetic sea water | 30 |
| 11 | synthetic sea water + 3% KCl | 20 |
| 12 | synthetic sea water + 3% KCl | 30 |

TABLE VI

| Time, Hours at 260° F. | SAMPLE NO.'S | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 24 | y | y | y | F.W. | y | y | y | y | y | y | y | y |
| 68 | y | y | y | y | W.R. | W.R. | y | y | y | y | y | y |
| 96 | L | y | y | y | S | S | y | y | y | y | y | y | y: = marble supported on gel surface
F.W.: = free water present in sample bottle, marble on gel surface
W.R.: = water ring around gel in sample bottle, marble on gel surface
S: = about 30–50% free water present and marble on gel surface
L: = sample bottle cap seal leaked, no data collected The foregoing test illustrates the ability of the gels of the present invention to carry a particulate such as proppant or a gravel pack material when exposed to elevated temperatures such as might occur in a subterranean formation and in a variety of brine completion fluids.

EXAMPLE V

To demonstrate the ability of a pH change to reduce the viscosity of the crosslinked fluid of the present invention, the following test was performed. A sample was prepared with the gelling agent of Example I present in an amount of 20 pounds per 1000 gallons of 2% NH4Cl brine. The equivalent of 10 gallons per 1000 gallons of fluid of 15% HCl was added to the gel to accelerate hydration. The equivalent of 15 pounds per 1000 gallons of fluid of MgO was added to the sample. The viscosity was measured with a "FANN MODEL 50" viscometer. After 20 minutes 10 pounds per 1000 gallons of fluid of fumaric acid was admixed with the crosslinked gel to simulate contact with an acidic fluid. The pH and viscosity of the fluid then was monitored to determine the effect of the pH change upon the crosslinked gel. The results of the test are set forth in Table VII, below.

TABLE VII

| Time, Minutes:Seconds | pH | Apparent Viscosity, (cps) at 511 Sec$^{-1}$ |
|---|---|---|
| 0:0[1.] | 1.67 | 9 |
| 2:37 | 4.00 | 9 |
| 3:00 | 6.00 | 9 |
| 4:02 | 7.00 | 13 |
| 8:55 | 8.00 | 22 |
| 20:03[2.] | 8.50 | 44 |
| 21:03 | 8.00 | 14 |
| 22:25 | 5.00 | 9 |
| 24:03 | 4.80 | 9 |

[1.]MgO added
[2.]fumaric acid added

The results clearly illustrate the return to base gel viscosity from a change in pH of the crosslinked gel.

EXAMPLE VI

To illustrate the improved sand transport capability of the present invention in comparison to hydroxyethyl cellulose, the following test was performed. A fluid sample corresponding to 80 pounds of hydroxyethyl cellulose (HEC) per 1000 gallons of 2% NH4Cl brine is prepared and a sample corresponding to 30 pounds of the copolymer of the present invention per 1000 gallons of 2% NH4Cl brine is prepared. The copolymer of the present invention is hydrated at a pH of 1.7. A portion of the hydrated copolymer sample is admixed with a quantity of MgO in an amount equivalent to 15 pounds per 1000 gallons of 2% NH4Cl brine to crosslink the slurry. Thereafter, 166 grams of 20-40 mesh sand (U.S. Sieve Series) is admixed with 138 ml. of each of the three fluids and the sand laden fluid samples are placed in 8 ounce bottles.

The amount of free fluid that accumulates above the slurry in each bottle is recorded over time. The more rapidly the free fluid accumulates, the faster is the sand settling rate in the fluid sample and the poorer the sand transport efficiency of the fluid sample. The results of the test are set forth in Table VIII, below.

TABLE VIII

| Time, Minutes | HEC Slurry Free Fluid, Centimeters | Uncrosslinked copolymer of present invention pH = 1.7 Free Fluid, Centimeters | Crosslinked copolymer of present invention pH = 8.0 Free Fluid, Centimeters |
|---|---|---|---|
| 0.1 | 0 | 0 | 0 |
| 1.0 | 0 | 0.85 | 0 |
| 2.0 | 0.05 | 1.35 | 0 |
| 3.0 | 0.09 | 2.10 | 0 |
| 6.0 | 0.28 | 3.10 | 0 |

The results clearly demonstrate the ability of the crosslinked copolymer slurry of the present invention to efficiently transport particulate in a gravel pack treatment. The results also show how rapidly the sand will settle from the slurry when the fluid is uncrosslinked. This is comparable to the effect achieved upon reversing the crosslink of the copolymer slurry by contact with a pH adjusting agent which lowers the pH of the gel slurry. The results also demonstrate that substantially lower concentrations of the copolymer of the present invention may be utilized in a gravel pack slurry to efficiently transport proppant than is required with an uncrosslinked HEC.

While that which is believed to comprise preferred embodiments of the invention have been described herein, it is to be understood that changes or modifications in the method may be made by individuals skilled in the art without departing from the spirit or scope of the invention as set forth in the appended claims.

What is claimed is:

1. A method of gravel packing a wellbore penetrating a subterranean formation comprising:
    admixing a polymer derivative comprising a reaction product produced by the reaction of hydroxyalkyl cellulose having a molar substitution of from about 1.5 to about 3, the alkyl being selected from the group of ethyl and propyl, and a vinyl phosphonic acid in the presence of a redox system at a temperature in the range of from about 20° to about 60° C. with a sufficient quantity of an aqueous fluid containing at least a trace amount of at least one divalent cation to form a base gel;
    admixing a sufficient quantity of a crosslinking activator comprising a Lewis base or Bronsted-Lowry base which is substantially free of polyvalent metal ions with said base gel to effect crosslinking of said polymer derivative;
    admixing a particulate agent with said base gel to form a slurry;
    introducing an acidic fluid into the wellbore penetrating the subterranean fluid whereby said acid fluid is positioned within a zone of said formation which is to be gravel packed;
    introducing the slurry into the zone to be gravel packed whereby said slurry contacts said acidic fluid and the pH of said slurry is reduced whereby the viscosity of said slurry decreases; and
    depositing said particulate agent within said zone within said formation to form a permeable pack.

2. The method of claim 1 wherein said particulate agent is present in an amount of from about 1 to about 20 pounds per gallon.

3. The method of claim 1 wherein said particulate agent has an adhesive on at least a portion of said particulate.

4. The method of claim 1 wherein said particulate agent has a specific gravity below about 3.0 and above about 0.75.

5. The method of claim 1 wherein said base comprises at least one member selected from the group of magnesium oxide, mono, di or trialkanol amines, calcium oxide, sodium hydroxide, potassium hydroxide, ammonia, cocoamines, pentamines, alkyldiethanol amines, triethanol amine, an admixture of boric acid and borate salts and diethylamine.

6. The method of claim 1 wherein said well is deviated in excess of about 55 degrees from a vertical inclination.

7. A method of gravel packing a wellbore penetrating a subterranean formation comprising:
preparing a gravel packing slurry by admixing (i) an aqueous liquid containing at least a trace amount of at least one divalent cation with (ii) a polymer derivative that is chemically modified by reacting at least one member selected from hydroxyethyl cellulose and hydroxypropyl cellulose with a vinyl phosphonic acid in the presence of a redox system, (iii) a crosslinking activator comprising a Lewis base or a Bronsted-Lowry base and (iv) a particulate agent,
introducing said slurry into a zone to be gravel packed within said wellbore penetrating said subterranean formation;
introducing an acidic fluid into said zone to be gravel packed within said wellbore;
contacting said slurry with said acidic fluid whereby the pH of said slurry is reduced whereby the viscosity of said slurry decreases; and,
depositing said particulate agent within said zone within said formation to form a permeable pack.

8. The method of claim 7 wherein said chemical modification of said polymer is defined further as reacting said member with a vinyl phosphonic acid in a reaction media comprising at least one member selected from the group of tetramethyl ammonium chloride, polyethylene glycol and polypropylene glycol to which the redox initiator is added.

9. The method of claim 8 defined further to include a dispersant in said reaction media.

10. The method of claim 9 wherein said dispersant comprises at least one member selected from the group of alkyl quaternary ammonium montmorillonite and dimethyldicocoammonium chloride.

11. The method of claim 8 wherein said reaction is defined further to be performed at a temperature in the range of from about 20° to about 60° C.

12. The method of claim 7 wherein said crosslinking activator comprises magnesium oxide.

13. The method of claim 7 wherein said particulate agent has an adhesive on at least a portion of said particulate.

14. The method of claim 7 wherein said particulate agent has a specific gravity below about 3.0 and above about 0.75.

15. The method of claim 7 wherein said base comprises at least one member selected from the group of magnesium oxide, mono, di or trialkanol amines, calcium oxide, sodium hydroxide, potassium hydroxide, ammonia, cocoamines, pentamines, alkyldiethanol amines, triethanol amine, an admixture of boric acid and borate salts and diethylamine.

16. The method of claim 7 wherein said well is deviated in excess of about 55 degrees from a vertical inclination.

17. A method of gravel packing a highly deviated wellbore penetrating a subterranean formation comprising:
preparing a base gel by admixing an aqueous liquid containing at least a trace amount of at least one divalent cation with a cellulose ether derivative that is chemically modified by reacting a hydroxyalkyl cellulose with a vinyl phosphonic acid in the presence of a redox system;
filtering said base gel to remove unhydrated cellulose derivative and any other insolubles present therefrom;
admixing a sufficient quantity of a crosslinking activator comprising a Lewis base or Bronsted-Lowry base, which is substantially free of polyvalent metal ions, with said base gel to effect crosslinking of said gel;
admixing a particulate agent with said gel to form a slurry;
introducing said slurry into a zone in the wellbore penetrating the subterranean formation which is to be gravel packed;
introducing an acidic fluid into said zone in the wellbore penetrating the subterranean formation which is to be gravel packed;
contracting said slurry with said acidic fluid in said zone whereby the pH of said slurry is caused to decrease whereby the viscosity of said slurry is caused to decrease; and
depositing said particulate agent within said zone within said formation to form a permeable pack.

18. The method of claim 17 wherein said base comprises at least one member selected from the group of magnesium oxide, mono, di or trialkanol amines, calcium oxide, sodium hydroxide, potassium hydroxide, ammonia, cocoamines, pentamines, alkyldiethanol amines, triethanol amine, an admixture of boric acid and borate salts and diethylamine.

19. The method of claim 17 wherein said particulate agent has an adhesive on at least a portion of said particulate.

20. The method of claim 17 wherein said particulate agent has a specific gravity below about 3.0 and above about 0.75.

* * * * *